US008818693B2

(12) United States Patent
Kimura et al.

(10) Patent No.: US 8,818,693 B2
(45) Date of Patent: Aug. 26, 2014

(54) ENGINE SYSTEM CONTROL DEVICE

(75) Inventors: Koichi Kimura, Numazu (JP); Hiroshi Sawada, Gotenba (JP); Toru Kidokoro, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 747 days.

(21) Appl. No.: 13/132,451

(22) PCT Filed: Dec. 3, 2008

(86) PCT No.: PCT/JP2008/072459
§ 371 (c)(1),
(2), (4) Date: Aug. 1, 2011

(87) PCT Pub. No.: WO2010/064329
PCT Pub. Date: Jun. 10, 2010

(65) Prior Publication Data
US 2011/0290217 A1    Dec. 1, 2011

(51) Int. Cl.
| | |
|---|---|
| *F02B 75/04* | (2006.01) |
| *F02D 41/02* | (2006.01) |
| *F02D 15/00* | (2006.01) |
| *F02D 15/04* | (2006.01) |
| *F02D 13/00* | (2006.01) |
| *F02D 41/14* | (2006.01) |
| *F02D 41/22* | (2006.01) |
| *F01N 11/00* | (2006.01) |

(52) U.S. Cl.
CPC .............. *F02D 41/221* (2013.01); *Y02T 10/40* (2013.01); *F02D 41/1446* (2013.01); *F02D 41/222* (2013.01); *F01N 11/00* (2013.01); *F01N 2550/00* (2013.01); *F02D 41/1495* (2013.01); *F02D 41/1488* (2013.01); *F02D 2041/227* (2013.01); *F02D 41/0235* (2013.01); *F02D 15/00* (2013.01); *F02D 15/04* (2013.01)
USPC ......................................... 701/114; 123/48 C

(58) Field of Classification Search
USPC ............. 701/114, 101, 102; 123/48 C, 90.15, 123/90.16, 345
See application file for complete search history.

(56) References Cited

U.S. PATENT DOCUMENTS

| 5,220,788 A | 6/1993 | Kurita et al. |
|---|---|---|
| 5,752,382 A | 5/1998 | Hanafusa et al. |

(Continued)

FOREIGN PATENT DOCUMENTS

| DE | 10 2004 009 999 A1 | 10/2004 |
|---|---|---|
| EP | 0 475 177 A2 | 3/1992 |

(Continued)

OTHER PUBLICATIONS

Office Action issued in corresponding U.S. Appl. No. 12/741,257 dated Jun. 17, 2013.

(Continued)

*Primary Examiner* — Hieu T Vo
(74) *Attorney, Agent, or Firm* — Oliff PLC

(57) ABSTRACT

The present invention provides an engine system control device to be applied to an engine system provided with an engine having a variable compression ratio mechanism capable of changing a compression ratio. In the case where generation of failure in a compression ratio control system is detected, determination of a state of a member placed in an intake and exhaust system of the engine is inhibited.

8 Claims, 8 Drawing Sheets

(56) References Cited

U.S. PATENT DOCUMENTS

| | | |
|---|---|---|
| 7,043,349 B2 | 5/2006 | Cullen |
| 7,275,363 B2 | 10/2007 | Miura et al. |
| 7,278,383 B2 * | 10/2007 | Kamiyama et al. ......... 123/48 C |
| 7,392,129 B2 * | 6/2008 | Hill et al. ...................... 701/105 |
| 2002/0139346 A1 | 10/2002 | Aoyama et al. |
| 2003/0084875 A1 | 5/2003 | Cullen |
| 2004/0000135 A1 | 1/2004 | Uchida |
| 2006/0129304 A1 | 6/2006 | Takemura et al. |
| 2006/0137326 A1 | 6/2006 | Saito et al. |
| 2007/0220868 A1 | 9/2007 | Nishizawa et al. |
| 2007/0227124 A1 | 10/2007 | Fujiki et al. |
| 2007/0277504 A1 | 12/2007 | Ishikawa et al. |

FOREIGN PATENT DOCUMENTS

| | | |
|---|---|---|
| EP | 1 247 971 A2 | 10/2002 |
| EP | 1 464 814 A2 | 10/2004 |
| EP | 1 672 346 A2 | 6/2006 |
| JP | A-02-163429 | 6/1990 |
| JP | A-5-010182 | 1/1993 |
| JP | A-5-133264 | 5/1993 |
| JP | A-6-159153 | 6/1994 |
| JP | A-2000-213406 | 8/2000 |
| JP | A-2000-227364 | 8/2000 |
| JP | A-2002-285898 | 10/2002 |
| JP | A-2003-129906 | 5/2003 |
| JP | A-2003-148230 | 5/2003 |
| JP | A-2003-206771 | 7/2003 |
| JP | A-2003-254135 | 9/2003 |
| JP | A-2004-028029 | 1/2004 |
| JP | A-2004-156541 | 6/2004 |
| JP | A-2004-169660 | 6/2004 |
| JP | A-2004-197716 | 7/2004 |
| JP | A-2004-225684 | 8/2004 |
| JP | A-2004-263626 | 9/2004 |
| JP | A-2004-278415 | 10/2004 |
| JP | A-2005-069204 | 3/2005 |
| JP | A-2005-069218 | 3/2005 |
| JP | A-2006-37841 | 2/2006 |
| JP | A-2006-46194 | 2/2006 |
| JP | A-2006-161583 | 6/2006 |
| JP | A-2006-169996 | 6/2006 |
| JP | A-2006-183511 | 7/2006 |
| JP | A-2006-291742 | 10/2006 |
| JP | A-2006-291828 | 10/2006 |
| JP | A-2007-016712 | 1/2007 |
| JP | A-2007-056837 | 3/2007 |
| JP | A-2007-064089 | 3/2007 |
| JP | A-2007-064153 | 3/2007 |
| JP | A-2007-213820 | 9/2007 |
| JP | A-2007-224927 | 9/2007 |
| JP | A-2007-262945 | 10/2007 |
| JP | A-2007-303423 | 11/2007 |
| JP | A-2007-327351 | 12/2007 |
| JP | A-2008-019799 | 1/2008 |
| JP | A-2008-133802 | 6/2008 |
| JP | A-2008-152318 | 7/2008 |
| JP | A-2008-157128 | 7/2008 |

OTHER PUBLICATIONS

Feb. 10, 2009 International Search Report issued in International Application No. PCT/JP2008/072459, with translation.

Feb. 10, 2009 International Preliminary Report on Patentability issued in International Application No. PCT/JP2008/072459.

Feb. 3, 2009 International Search Report issued in International Application No. PCT/JP2008/070635, with translation.

Feb. 3, 2009 International Preliminary Report on Patentability issued in International Application No. PCT/JP2008/070635.

U.S. Appl. No. 12/741,257 in the name of Akihisa, et al., filed May 4, 2010.

* cited by examiner

ENGINE SYSTEM CONTROL DEVICE

BACKGROUND OF THE INVENTION

1. Technical Field

The present invention relates to an engine system control device to be applied to an engine system (system provided with an engine such as an automobile). The present Invention particularly relates to an engine system control device in the case where the engine has a variable compression ratio mechanism capable of changing a compression ratio.

2. Related Art

In an engine system, state determination of an intake and exhaust system, that is, failure diagnosis is performed by an engine electronic control unit (hereinafter, called as the "ECU"). Such on-board diagnosis (OBD) of the intake and exhaust system includes catalyst failure diagnosis, exhaust gas sensor failure diagnosis, and canister purge system failure diagnosis.

For example, in an exhaust passage for this type of system, a catalyst for purifying an exhaust gas is placed. This catalyst is deteriorated due to harmful components (such as lead and sulfur) in fuel and excessive heating. When the catalyst is deteriorated, an exhaust gas purifying ratio is degraded, and exhaust emission is increased. Thus, various devices for determining deterioration of the catalyst are conventionally proposed (such as Japanese Patent Application Publication No. 1993(H5)-133264 and 2004-28029).

As this kind of catalyst, a so-called ternary catalyst is widely used. This ternary catalyst has a function called an oxygen absorption function or an oxygen storage function. In the case where an air-fuel ratio of the fuel-mixing air is lean, such a function is to reduce NOx (nitrogen oxide) in the exhaust gas and absorb (store) oxygen taken from NOx inside. Meanwhile, in the case where the air-fuel ratio of the fuel-mixing air is rich, the function is to release the absorbed oxygen for oxidation of unburned components such as Him and CO in the exhaust gas.

Thus, the more a maximum value of an oxygen amount to be absorbed by the ternary catalyst (hereinafter, called as the "oxygen absorption amount") is, the higher a purifying ability of the ternary catalyst is. Therefore, a deterioration state of the ternary catalyst can be determined by the maximum value of the oxygen absorption amount (hereinafter, called as the "maximum oxygen absorption amount").

In a catalyst deterioration degree detection device disclosed in Japanese Patent Application Publication No. 1993 (H5)-133264, a first air-fuel ratio sensor is arranged at a position on the upstream side of a ternary catalyst in an exhaust passage and a second air-fuel ratio sensor is arranged at a position on the downstream side of the ternary catalyst in the exhaust passage.

Deterioration determination of the ternary catalyst (calculation of the maximum oxygen absorption amount) with such a configuration is performed as follows. Firstly, the air-fuel ratio of the fuel-mixing air supplied into a cylinder of an engine is set to be a predetermined lean air-fuel ratio for a predetermined time. Thereby, oxygen is absorbed by the ternary catalyst up to a limit of an absorbing ability. After that, the air-fuel ratio of the fuel-mixing air is forcibly changed to a predetermined rich air-fuel ratio. Then, the air-fuel ratio detected by the second air-fuel ratio sensor is changed to the rich ratio after maintained to be a theoretical air-fuel ratio only for a fixed time $\Delta t$. The maximum oxygen absorption amount is determined based on a difference $\Delta$ (A/F) between the theoretical air-fuel ratio and the rich air-fuel ratio, the time $\Delta t$, and an intake air amount of this time.

This maximum oxygen absorption amount is changed even with a temperature of the ternary catalyst. Specifically, when the temperature of the ternary catalyst is increased, the maximum oxygen absorption amount is increased. Thus, when the deterioration determination of the catalyst is performed based on the maximum oxygen absorption amount calculated without considering the temperature of the catalyst, there is a problem that determination precision is not favorable. In a catalyst deterioration degree detection device disclosed in Japanese Patent Application Publication No. 2004-28029, the maximum oxygen absorption amount is corrected based on the temperature of the catalyst in a calculation period of the maximum oxygen absorption amount.

In order to control the air-fuel ratio of the engine, so-called air-fuel ratio feedback control is generally performed. This control is performed based on an output of an exhaust gas sensor (air-fuel ratio sensor) placed in an exhaust passage. In general, this exhaust gas sensor is an oxygen sensor for generating an output in accordance with oxygen concentration in the exhaust gas. This exhaust gas sensor is provided on the upstream side and/or the downstream side in the flowing direction of the exhaust gas relative to the catalyst for purifying the exhaust gas.

In general, as the exhaust gas sensor provided on the downstream side relative to the catalyst (second air-fuel ratio sensor described above), a solid electrolyte type oxygen sensor having an output characteristic in which an output is substantially fixed on the rich and lean sides of the theoretical air-fuel ratio whereas the output is radically changed around the theoretical air-fuel ratio is used. As the exhaust gas sensor provided on the upstream side relative to the catalyst (first air-fuel ratio sensor described above), the solid electrolyte type oxygen sensor or a limiting current type oxygen concentration sensor having a relatively linear output characteristic within a wide air-fuel ratio range is used.

When failure such as the deterioration is generated in the exhaust gas sensor, there is a fear that air-fuel ratio control of the engine is not properly performed. The exhaust gas sensor is also used to calculate the maximum oxygen absorption amount for the deterioration determination of the catalyst as described above. Therefore, when the failure such as the deterioration is generated in the exhaust gas sensor, the deterioration determination of the catalyst cannot be accurately performed.

Thus, a device for diagnosing the failure of this exhaust gas sensor is conventionally proposed (for example, refer to Japanese Patent Application Publication No. 2003-254135, 2004-225684, 2007-16712, and the like). This device is to determine whether or not the exhaust gas sensor normally works in accordance with a responding state of the exhaust gas sensor to an air-fuel ratio change of the fuel-mixing air. For example, in a device disclosed in Japanese Patent Application Publication No. 2004-225684, the air-fuel ratio is alternately forcibly changed between a predetermined rich air-fuel ratio and a predetermined lean air-fuel ratio, and presence of failure of a sensor is determined based on whether or not a sensor output rightly following this air-fuel ratio change is generated.

SUMMARY OF THE INVENTION

There are known engines provided with a variable compression ratio mechanism capable of changing a compression ratio (for example, refer to Japanese Patent Application Publication No. 2003-206771, 2004-156541, 2005-69204, 2006-161583, 2007-224927, and the like). It should be noted that the variable "compression ratio" here includes a "mechanical compression ratio" and an "actual compression ratio".

The mechanical compression ratio is a value determined by dividing the sum of clearance volume (combustion chamber volume at a piston top dead center) and volume of a piston stroke by the clearance volume, and is also called as a nominal compression ratio or a geometrical compression ratio. The mechanical compression ratio can be changed for example by relatively moving a crankcase on which a crankshaft is rotatably supported, and a cylinder block with an upper end thereof to which a cylinder head is fixed along an axis of a cylinder. Alternatively, the mechanical compression ratio can be changed by, in the case where a connecting rod (member for coupling a piston and the crankshaft) is bendable, changing a bent state of this connecting rod.

The actual compression ratio is an effective compression ratio to the intake air, and typically a value determined by dividing the combustion chamber volume at the time of starting compression of the intake air by the combustion chamber volume at the time of finishing the compression. This actual compression ratio can be changed in accordance with the above change in the mechanical compression ratio. This actual compression ratio can be changed by varying action timing of an intake valve and an exhaust valve together with the change in the mechanical compression ratio or in place of this change.

It should be noted that an expansion ratio can also be changed by the change in the mechanical compression ratio. The expansion ratio is a ratio of volume at the end of expansion in an expansion stroke to volume at the beginning of the expansion (clearance volume). it should be noted that this expansion ratio can be changed by changing opening and closing timing of the exhaust valve.

Further, by changing opening and closing timing of the intake and exhaust valves, the mechanical compression ratio, the actual compression ratio, and the expansion ratio can be independently set and changed (for example, refer to Japanese Patent Application Publication No. 2007-303423, 2008-19799, 2008-157128, and the like).

In the case where such a mechanism for changing the compression ratio and the expansion ratio or a control device thereof in the engine is broken, a combustion state of the fuel-mixing air and the temperature of the exhaust gas cannot be controlled, so that parameters (such as the temperature of a member to be diagnosed or the exhaust gas) required for the on-board diagnosis of the intake and exhaust system can become unknown. Therefore, in this case, it may be difficult to perform the on-board diagnosis precisely.

An object of the present invention is to improve precision of the on-board diagnosis of the intake and exhaust system in an engine system provided with an engine in which the compression ratio or the expansion ratio is variable.

<Configuration>

An engine system control device of the present invention (hereinafter, simply referred to as the "control device") is applied to an engine system provided with an engine having a variable compression ratio mechanism capable of changing a compression ratio. It should be noted that this engine includes an engine in which an expansion ratio is variable. That is, this engine may include an engine in which a mechanical compression ratio, an actual compression ratio, and the expansion ratio can be independently set and changed by changing the mechanical compression ratio and opening and closing timing of intake and exhaust valves.

This control device is provided with a compression ratio acquiring unit, a compression ratio control system failure detecting unit, an intake and exhaust system determining unit, and an intake and exhaust system determination permitting unit. It should be noted that the term "unit" may be called as a term "means" (such as the "compression ratio acquiring means", or the like, the same is applied to the remaining similar items). In the configuration of the present invention, the "compression ratio" can be replaced with the "expansion ratio" (such as the "expansion ratio acquiring unit", or the like, the same is applied to the remaining similar items).

The compression ratio acquiring unit is configured to acquire a setting state of the compression ratio by the variable compression ratio mechanism (the term "acquiring" includes detection and estimation, the same is applied to the remaining similar items).

The compression ratio control system failure detecting unit is configured to detect generation of failure in a compression ratio control system including the variable compression ratio mechanism and the compression ratio acquiring unit.

The intake and exhaust system determining unit is configured to determine a state of a member placed in an intake and exhaust system of the engine. For example, this intake and exhaust system determining unit may be configured to determine the state of the member placed in a passage of an exhaust gas discharged from the engine (such as a catalyst or an exhaust gas sensor).

The intake and exhaust system determination permitting unit is configured to permit determination by the intake and exhaust system determining unit.

As a characteristic of the present invention, the intake and exhaust system determination permitting unit is configured to inhibit the determination by the intake and exhaust system determining unit, in the case where the compression ratio control system failure detecting unit detects the generation of the failure.

The intake and exhaust system determination permitting unit may be configured to permit the determination by the intake and exhaust system determining unit, in the case where the compression ratio control system failure detecting unit detects the generation of the failure but the setting state of the compression ratio is acquirable.

When the control device is further provided with a temperature acquiring unit for acquiring a temperature of the exhaust gas or the member, the intake and exhaust system determination permitting unit may be configured to permit the determination by the intake and exhaust system determining unit in the case where the compression ratio control system failure detecting unit detects the generation of the failure but the temperature is acquirable by the temperature acquiring unit.

<Operation and Effect>

In the engine system control device of the present invention provided with the above configuration, in the case where the compression ratio control system normally works, and a predetermined determination condition is met, the determination of the state of the member (such as catalyst OBD or exhaust gas sensor OBD) is performed. Meanwhile, in the case where the failure is generated in the compression ratio control system and the setting state of the compression ratio or the expansion ratio becomes unknown, the determination of the state of the member is inhibited.

However, in the case where the failure is generated in the compression ratio control system but the setting state of the compression ratio is acquirable or the temperature is acquirable, the determination of the state of the member is favorably performed. Therefore, in these occasions, the determination can be permitted.

As described above, according to the present invention, the on-board diagnosis of the intake and exhaust system (on-board diagnosis influenced by a state of the exhaust gas in particular) is properly performed in the engine system provided with the engine in which the compression ratio or the expansion ratio is variable. Therefore, precision of the diagnosis can be improved more than that of the conventional examples.

DETAILED DESCRIPTION THE INVENTION

Hereinafter, an embodiment of the present invention (embodiment that the applicant thinks the best at the time of filing the present application) will be described with reference to the drawings.

It should be noted that the following description relating to the embodiment is only to specifically describe just one concrete example for embodying the present invention within a practicable range in order to meet legal description requirement of the specification (descriptive requirement and enablement requirement). Therefore, as described below, it is a matter of course that the present invention is not at all limited to specific configurations of the embodiment described below. When modifications of the embodiment are inserted in the middle of the description of the embodiment, understanding of consistent description of the embodiment is prevented. Thus, the modifications will be collectively described in the last part.

<Entire Configuration of System>

Figure 1:
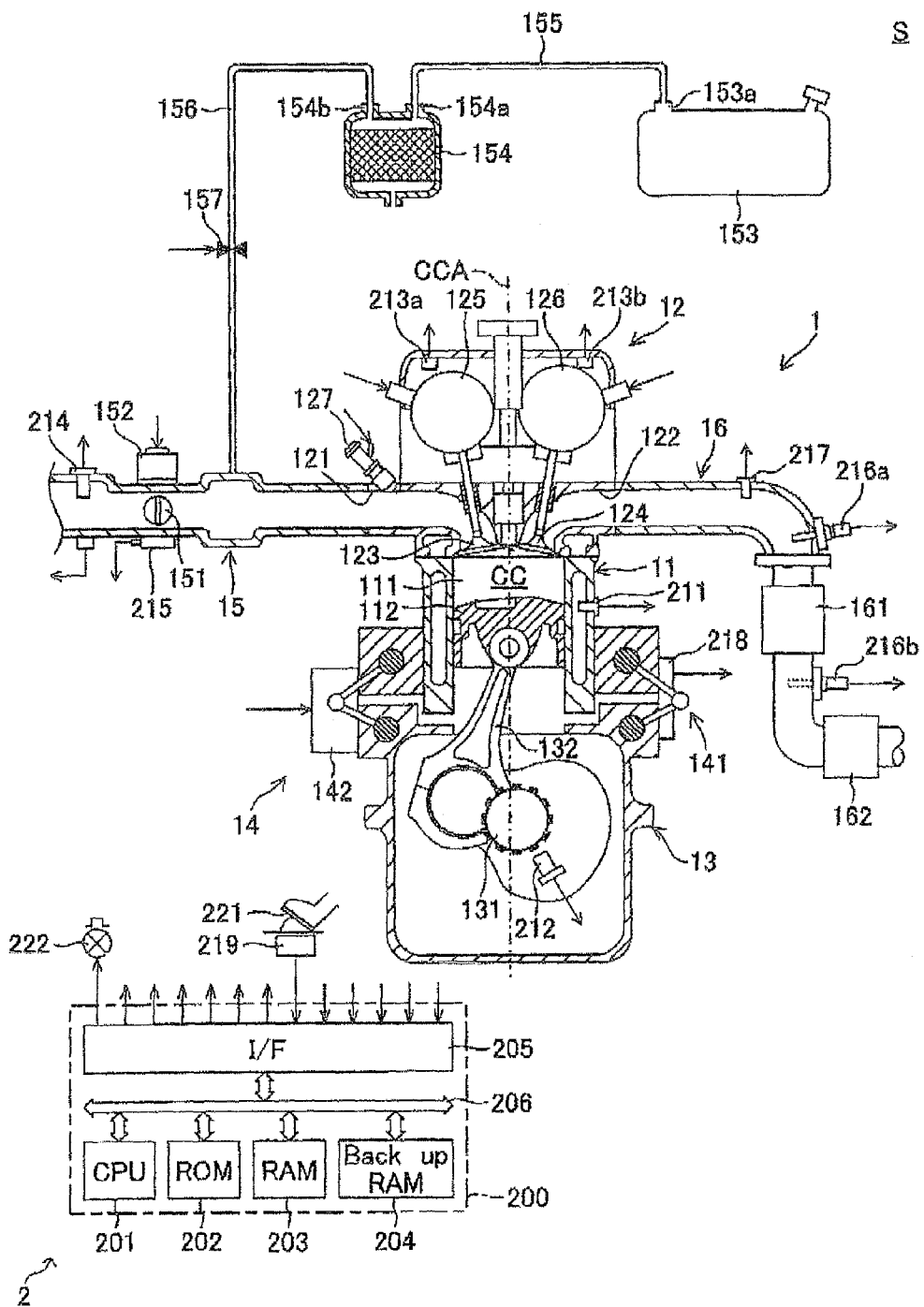
FIG. 1 is a schematic configuration diagram of major parts of an engine system (such as a vehicle) to which the present invention is applied.

Fig, 1 is a schematic configuration diagram of major parts of an engine system S (such as a vehicle) to which the present invention is applied. This engine system S is provided with an engine 1, and a control device 2 serving as one embodiment of the present invention, it should be noted that a side sectional view of the engine 1 by plane orthogonal to the cylinder arranging direction is shown in FIG. 1.

In the present embodiment, the engine 1 is formed so that a mechanical compression ratio is variable within a predetermined range. By changing the mechanical compression ratio and timing of intake and exhaust valves, the engine 1 is formed so that the mechanical compression ratio, an actual compression ratio, and an expansion ratio can be substantially independently set and changed.

Specifically, the engine 1 is provided with a cylinder block 11, a cylinder head 12, a crankcase 13, and a variable compression ratio mechanism 14. An intake passage 15 and an exhaust passage 16 are connected to the engine 1. Hereinafter, detailed configurations of these parts will be described.

<Engine Main Body>

A plurality of cylinder bores 111 is arranged in a row along the cylinder arranging direction in the cylinder block 11. A piston 112 is housed inside each of the cylinder bores 111 reciprocally along an axis of the cylinder bore 111 (hereinafter, this axis is referred to as the "cylinder axis CCA").

The cylinder head 12 is jointed to an upper end of the cylinder block 11, that is, an end of the cylinder block 11 on the top dead center side of the piston 112. The cylinder head 12 is fixed to the cylinder block 11 by bolts or the like (not shown).

A plurality of concave portions is provided at positions corresponding to upper ends of the cylinder bores 111 in a lower end of the cylinder head 12. In the state where the cylinder head 12 is jointed and fixed to the cylinder block 11, a combustion chamber CC is formed by a space inside the cylinder bore 111 on the upper side of a top surface of the piston 112 (on the side of the cylinder head 12), and a space inside (below) the above concave portion.

An intake port 121 and an exhaust port 122 are formed in the cylinder head 12 so as to communicate with the combustion chamber CC. The cylinder head 12 is provided with an intake valve 123, an exhaust valve 124, a variable intake valve timing device 125, and a variable exhaust valve timing device 126.

The intake valve 123 is a valve for controlling a communication state between the intake port 121 and the combustion chamber CC. The exhaust valve 924 is a valve for controlling a communication state between the exhaust port 122 and the combustion chamber CC. The variable intake valve timing device 125 and the variable exhaust valve timing device 126 are formed so as to change the actual compression ratio and the expansion ratio by changing opening and closing timing of the intake valve 123 and the exhaust valve 124. Since specific configurations of the variable intake valve timing device 125 and the variable exhaust valve timing device 126 are already known, more detailed description will be omitted in the present specification.

The cylinder head 12 is also provided with an injector 127. The injector 127 is formed so as to jet fuel to be supplied into the combustion chamber CC into the intake port 121.

A crankshaft 131 is arranged in parallel to the cylinder arranging direction and rotatably supported in the crankcase 13. The crankshaft 131 is coupled to the piston 112 via a connecting rod 132 so as to be rotated and driven based on reciprocating movement of the piston 112 along the cylinder axis CCA.

<<Variable Compression Ratio Mechanism>>

In the present embodiment, the variable compression ratio mechanism 14 is formed so as to change the mechanical compression ratio within the above range by relatively moving a joint body of the cylinder block 11 and the cylinder head 12 relative to the crankcase 13 along the cylinder axis CCA. This variable compression ratio mechanism 14 is provided with the same configuration as a variable compression ratio mechanism described in Japanese Patent Application Publication No. 2003-206771 or the like. Therefore, in the present specification, detailed description of this mechanism will be omitted, and only an outline thereof will be described below.

The variable compression ratio mechanism 14 is provided with a coupling mechanism 141, and a drive mechanism 142. The coupling mechanism 141 is formed so as to couple the cylinder block 11 and the crankcase 13 movably relative to each other along the cylinder axis CCA. The drive mechanism 142 is provided with a motor, a gear mechanism, and the like. This drive mechanism 142 is formed so as to move the cylinder block 11 and the crankcase 13 relative to each other along the cylinder axis CCA.

<Intake and Exhaust Passages>

The intake passage 15 including an intake manifold, a surge tank, and the like is connected to the intake port 121. A throttle valve 151 is placed in the intake passage 15. The throttle valve 151 is formed so as to be rotated and driven by a throttle valve actuator 152 formed by a DC motor.

A fuel tank 153 is connected to the injector 127 via a fuel supply path (not shown). A vapor discharge port 153a for discharging "vaporized fuel" (hereinafter, called as the "vapor") is provided in an upper end of the fuel tank 153. The vapor discharged from the fuel tank 153 via the vapor discharge port 153a is absorbed by a canister 154.

The canister 154 is a known charcoal canister formed so as to absorb a predetermined amount of vapor. The canister 154 is provided with a tank port 154a, and a purge port 154b. The tank port 154a is connected to the vapor discharge port 153a of the fuel tank 153 via a vapor collecting pipe 155. The purge port 154b is connected to a position of the intake passage 15 between the throttle valve 151 and the injector 127 via a purge flow passage 155. A purge control valve 157 serving as an electromagnetic open and close valve is placed in the purge flow passage 156.

The exhaust passage 15 including an exhaust manifold is connected to the exhaust port 122. The exhaust passage 16 is a passage of an exhaust gas discharged from the combustion chamber CC via the exhaust port 122.

An upstream catalyst converter 151 and a downstream catalyst converter 162 are placed in the exhaust passage 15. In the present embodiment, the upstream catalyst converter 161 and the downstream catalyst converter 162 are provided with ternary catalysts having an oxygen absorption function inside thereof, and formed so as to purify HC, CO, and NOx in the exhaust gas.

<Control Device>

The control device 2 is formed so as to control operation of the engine 1 provided with the above configuration, determine (diagnose) states of the parts of the engine system S, and appropriately display determination (diagnosis) results to a driver. Hereinafter, a specific configuration of the control device 2 of the present embodiment will be described.

The control device 2 is provided with an ECU (electronic control unit) 200. The ECU 200 is provided with a CPU 201, a ROM 202, a RAM 203, a backup RAM 204, an interface 205, and a bus 206. The CPU 201, the ROM 202, the RAM 203, the backup RAM 204, and the interface 205 are connected to each other by the bus 206.

Routines (programs) to be executed by the CPU 201, tables (look-up tables, maps), parameters, and the like ate preliminarily stored in the ROM 202. The RAM 203 is formed so as to temporarily store data according to need when the CPU 201 executes the routines. The backup RAM 204 is formed so as to store the data when the CPU 201 executes the routines in a power activation state, and to maintain this stored data even after power shut-down.

The interface 205 is electrically connected to various sensors described below, and formed so as to transmit signals from these sensors to the CPU 201. The interface 205 is electrically connected to operating units such as the variable intake valve timing device 125, the variable exhaust valve timing device 126, the injector 127, and the drive mechanism 142, and formed so as to transmit operation signals for operating these operating units from the CPU 201 to these operating units.

That is, the ECU 200 is formed so as to receive the signals from the various sensors via the interface 205, and send the above operation signals toward the operating units in accordance with calculation results of the CPU 201 based on the signals.

<<Various Sensors>>

The engine system S is provided with the various sensors such as a cooling water temperature sensor 211, a crank position sensor 212, an intake cam position sensor 213a, an exhaust cam position sensor 213b, an air flow meter 214, a throttle position sensor 215, an upstream air-fuel ratio sensor 216a, a downstream air-fuel ratio sensor 216b, an exhaust temperature sensor 217, a stroke sensor 218, and an accelerator press-down degree sensor 219.

The cooling water temperature sensor 211 is installed in the cylinder block 11. This cooling water temperature sensor 211 is formed so as to output a signal corresponding to a temperature of cooling water (cooling water temperature Tw) in the cylinder block 11.

The crank position sensor 212 is installed In the crankcase 13. This crank position sensor 212 is formed so as to output a waveform signal having a pulse in accordance with a rotation angle of the crankshaft 131. Specifically, the crank position sensor 212 is formed so as to output a signal having a narrow pulse for every time when the crankshaft 131 is rotated by 10° and having a wide pulse for every time when the crankshaft 131 is rotated by 360°. That is, the crank position sensor 212 is formed so as to output a signal corresponding to the engine rotation number Ne.

The intake cam position sensor 213a and the exhaust cam position sensor 213b are installed in the cylinder head 12. The intake cam position sensor 213a is formed so as to output a waveform signal having a pulse in accordance with a rotation angle of an intake cam shaft (not shown: included in the variable intake valve timing device 125) for reciprocatingly moving the intake valve 123. The exhaust cam position sensor 213b is similarly formed so as to output a waveform signal having a pulse in accordance with a rotation angle of an exhaust cam shaft (not shown).

The air flow meter 214 and the throttle position sensor 215 are installed in the intake passage 15. The air flow meter 214 is formed so as to output a signal corresponding to a mass flow rate of the intake air flowing in the intake passage 15 (intake air flow rate Ga). The throttle position sensor 215 is formed so as to output a signal corresponding to a rotation phase of the throttle valve 151 (throttle valve aperture TA).

The upstream air-fuel ratio sensor 216a and the downstream air-fuel ratio sensor 216b are installed in the exhaust passage 16. The upstream air-fuel ratio sensor 216a is arranged on the upstream side in the flowing direction of the exhaust gas relative to the upstream catalyst converter 161. The downstream air-fuel ratio sensor 216b is arranged between the upstream catalyst converter 161 and the downstream catalyst converter 162, that is, on the downstream side in the flowing direction of the exhaust gas relative to the upstream catalyst converter 161 and on the upstream side relative to the downstream catalyst converter 162.

Figure 2A:
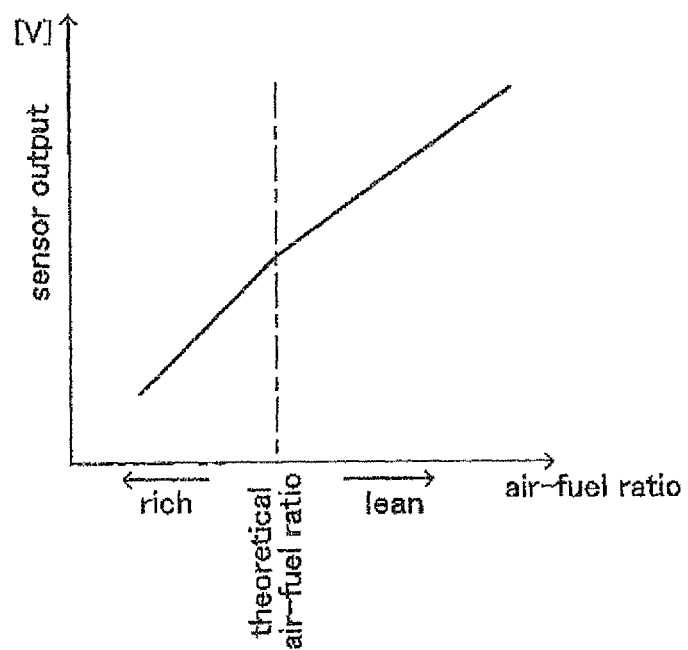
FIG. 2A is a graph showing an output characteristic of an upstream air-fuel ratio sensor shown in FIG. 1.
Figure 2B:
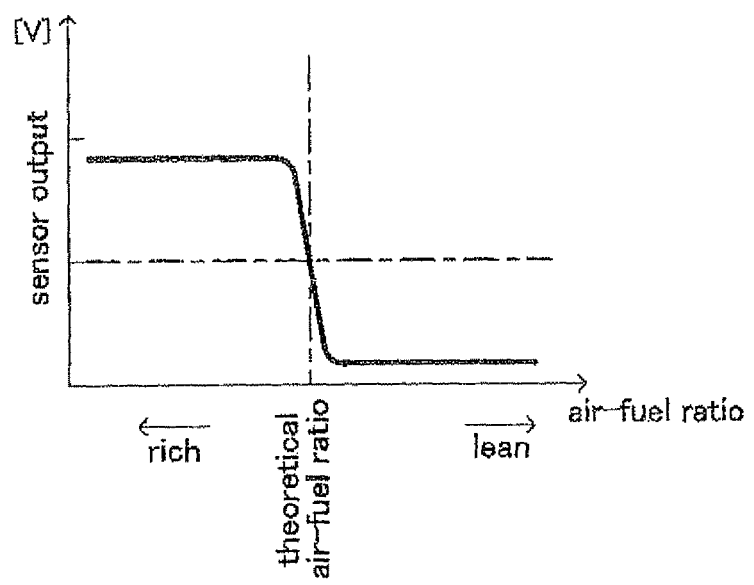
FIG. 2B is a graph showing an output characteristic of a downstream air-fuel ratio sensor shown in FIG. 1.

FIG. 2A is a graph showing an output characteristic of the upstream air-fuel ratio sensor 296a shown in FIG. 1. FIG. 2B is a graph showing an output characteristic of the downstream air-fuel ratio sensor 216b shown in FIG. 1.

As shown in FIG. 2A, the upstream air-fuel ratio sensor 216a is an entire-region type air-fuel ratio sensor having a relatively linear output characteristic within a wide air-fuel ratio range, Specifically, this upstream air-fuel ratio sensor 216*a* is formed by a limiting current type oxygen concentration sensor. As shown in FIG. 2B, the downstream air-fuel ratio sensor 216*b* is an air-fuel ratio sensor having an output characteristic in which an output is substantially fixed on the rich and lean sides of a theoretical air-fuel ratio whereas the output is radically changed around the theoretical air-fuel ratio. Specifically, the downstream air-fuel ratio sensor 216*b* is formed by a solid electrolyte type zirconium oxygen sensor.

Referring to FIG. 1 again, the exhaust temperature sensor 217 is installed on the upstream side in the flowing direction of the exhaust gas relative to the upstream air-fuel ratio sensor 216*a* in the exhaust passage 16. This exhaust temperature sensor 217 is formed so as to generate an output in accordance with a temperature of the exhaust gas flowing in the exhaust passage 16.

The stroke sensor 218 is a linear sensor for generating an output in accordance with a relative position of the cylinder block 11 to the crankcase 13, and is provided so as to be stretched over the cylinder block 11 and the crankcase 13.

The accelerator press-down degree sensor 219 is formed so as to output a signal corresponding to an operation amount of an accelerator pedal 221 operated by the driver (accelerator operation amount Accp). An alarm device 222 provided with an alarm indicating lamp or the like is provided at a position where the alarm device can easily catch eyes of the driver.

<Outline of Operation>

Hereinafter, an outline of actions of the engine system S of the present embodiment will be described.

<<Air-fuel Ratio Control>>

A target air-fuel ratio is set based on the throttle valve aperture TA or the like. This target air-fuel ratio is generally set to be the theoretical air-fuel ratio. Meanwhile, at the time of acceleration, etc., the target air-fuel ratio can be set to be a value slightly shifted from the theoretical air-fuel ratio to the rich or lean side, according to need.

When a predetermined sensor OBD condition is met, failure diagnosis (sensor OBD) of the upstream air-fuel ratio sensor 216*a* and the downstream air-fuel ratio sensor 216*b* is performed once per one trip (from one start of the engine 1 to stop thereof). During this sensor OBD, the target air-fuel ratio is controlled so that it changes in a rectangular waveform between a value shifted from the theoretical air-fuel ratio to the rich side and a value shifted from the theoretical air-fuel ratio to the lean side (so-called air-fuel ratio active control).

Similarly, in the case where deterioration determination of the upstream catalyst converter 161 (catalyst OBD) is performed under a predetermined operation state during normal operation, the above air-fuel ratio active control is also performed.

Based on the target air-fuel ratio set as described above, the intake air flow rate Ga, and the like, a basic value of a fuel amount jetted from the injector 127 (basic fuel jet amount) is acquired.

In the case where a predetermined feedback control condition is not met, for example, in the case where the upstream air-fuel ratio sensor 216*a* and the downstream air-fuel ratio sensor 216*b* are not sufficiently warmed up immediately after the start of the engine 1 or the like, open-loop control based on the basic fuel jet amount is performed (in this open-loop control, learning control based on a learning correction coefficient can be performed).

In the case where the feedback control condition is met, the basic fuel jet amount is feedback corrected based on outputs from the upstream air-fuel ratio sensor 216*a* and the downstream air-fuel ratio sensor 216*b*, so that an actual fuel jet amount from the injector 127 (command fuel jet amount) is acquired. Based on the outputs from the upstream air-fuel ratio sensor 216*a* and the downstream air-fuel ratio sensor 216*b*, air-fuel ratio learning for acquiring the learning correction coefficient at the time of the above open-loop control is performed.

Since specific contents of such air-fuel ratio control are already known, more detailed description will be omitted in the present specification.

<<OBD>>

The OBD of an intake and exhaust system such as the upstream catalyst converter 161, the upstream air-fuel ratio sensor 216*a*, the downstream air-fuel ratio sensor 216*b*, and a canister purge system (such as the purge flow passage 156 or the purge control valve 157) is performed by the ECU 200 (CPU 201).

For example, the catalyst OBD is performed as follows.

By the above air-fuel ratio active control, the air-fuel ratio of the fuel-mixing air is forcibly changed into a rectangular waveform.

Firstly, the air-fuel ratio of the fuel-mixing air is set to be a predetermined lean air-fuel ratio for a predetermined time. Thereby, oxygen is absorbed by the ternary catalyst of the upstream catalyst converter 161 up to a limit of an absorbing ability. After that, the air-fuel ratio of the fuel-mixing air is forcibly changed to a predetermined rich air-fuel ratio. Then, the air-fuel ratio detected by the downstream air-fuel ratio sensor 216*b* is changed to the rich ratio after maintained to be the theoretical air-fuel ratio for a fixed time $\Delta T$.

A maximum oxygen absorption amount in the ternary catalyst of the upstream catalyst converter 161 is determined based on a difference $\Delta (A/F)$ between the theoretical air-fuel ratio and the rich air-fuel ratio, the time $\Delta t$, and an intake air amount of this time. By the acquired value of the maximum oxygen absorption amount, deterioration of the upstream catalyst converter 161 is determined.

Since specific contents of such catalyst OBD are already known, more detailed description will be omitted in the present specification.

The sensor OBD is performed as follows.

By the above air-fuel ratio active control, the air-fuel ratio of the fuel-mixing air is forcibly changed into a rectangular waveform. At this time, presence of failure of the upstream air-fuel ratio sensor 216*a* or the downstream air-fuel ratio sensor 216*b* is determined based on whether or not output waveforms rightly following the air-fuel ratio change are generated.

Since specific contents of such sensor OBD are already known, more detailed description will be omitted in the present specification.

Further, trouble determination of the canister purge system (canister purge OBD) is performed based on an output change in the upstream air-fuel ratio sensor 216*a* when opening and closing of the purge control valve 157 is controlled and purge is controlled to be turned on/off.

<<Control of Compression Ratio and Expansion Ratio>>

The mechanical compression ratio, the actual compression ratio, and the expansion ratio are controlled based on the operation state of the engine 1 such as a warming-up state and a load state.

The actual compression ratio is a value determined from actual stroke volume from actual start of a compression operation to arrival of the piston 112 to the top dead center, and clearance volume (volume of the combustion chamber CC with the piston 112 at the top dead center). The clearance volume is determined in accordance with a setting state of the mechanical compression ratio. Meanwhile, even when the piston 112 starts rising in a compression stroke, the compression operation is substantially not performed during the time when the intake valve 123 is opened. The actual compression operation is started from the time when the intake valve 123 is closed. Therefore, in the case where the mechanical compression ratio is fixed, the closing timing of the intake valve 123 is delayed, so that the actual compression ratio is lowered.

The expansion ratio is a ratio of volume at the end of expansion in an expansion stroke and the clearance volume. As described above, the clearance volume is determined in according with the setting state of the mechanical compression ratio. Meanwhile, the expansion ratio is variable according to the opening timing of the exhaust valve 124. For example, when the opening timing of the exhaust valve 124 is advanced in order to warm up the upstream catalyst converter 161 at an early stage, so that the temperature of the exhaust gas may be increased. When the opening timing of the exhaust valve 124 is delayed as much as possible, engine thermal efficiency can be enhanced.

Therefore, for example, at the time of low-load operation of the engine, the mechanical compression ratio is set to be high and the opening timing of the exhaust valve 124 is delayed as much as possible, so that the expansion ratio is set to be high (such as about 26) and the engine thermal efficiency is enhanced, and on the other hand, the closing timing of the intake valve 123 is delayed and the actual compression ratio is set to be low (such as about 11), so that failure combustion such as knocking can be suppressed (so-called high expansion ratio cycle).

Specifically, for example, according to a decrease in an engine load, the mechanical compression ratio and the expansion ratio are set to be high, whereas the closing timing of the intake valve 123 is delayed. Thereby, the actual compression ratio is set to be substantially fixed within a range of a low load or high load of the engine.

However, when the mechanical compression ratio and the expansion ratio are changed during the time of executing the OBD (hereinafter, referred to as the "specific OBD", this includes exhaust gas sensor OBD, catalyst OBD, and canister purge system OBD) influenced by a state of the exhaust gas (such as the temperature and composition), there is a fear that precision of the OBD is lowered.

Specifically, when the mechanical compression ratio and the expansion ratio are changed during the time of executing the specific OBD, a combustion state of the fuel-mixing air and the temperature of the exhaust gas are changed, so that this change influences the outputs of the upstream air-fuel ratio sensor 216a and the downstream air-fuel ratio sensor 216b, and the change in the temperature of the exhaust gas invites a change in a temperature of the upstream catalyst converter 161 and the oxygen absorption function (oxygen absorption and release characteristic) of the upstream catalyst converter 161 is changed. Particularly, in the OBD of the downstream air-fuel ratio sensor 216b, it is difficult to perform precise OBD unless the oxygen absorption function of the upstream catalyst converter 161 is fixedly maintained.

Therefore, the variable compression ratio mechanism 14, the variable intake valve timing device 125, and the variable exhaust valve timing device 126 are controlled so that the mechanical compression ratio and the expansion ratio in the specific OBD are (substantially) fixedly maintained. Alternatively, in a state that the mechanical compression ratio and the expansion ratio are (substantially) fixedly maintained, execution of the specific OBD is permitted.

<<At the Time of Failure in Control System of Compression Ratio and Expansion Ratio>>

In the case where a control system of the compression ratio and the expansion ratio is broken, the combustion state of the fuel-mixing air and the temperature of the exhaust gas cannot be controlled, so that the parameters (such as the temperature of the exhaust gas or members to be diagnosed) required for the specific OBD pan become unknown. Therefore, in this case, it may be difficult to perform the specific OBD precisely.

It should be noted that the above "control system of the compression ratio and the expansion ratio" includes the variable compression ratio mechanism 14, the variable intake valve timing device 125, the variable exhaust valve timing device 126, the intake cam position sensor 213a, the exhaust cam position sensor 213b, and the stroke sensor 216. Hereinafter, this is called as the "compression ratio control system". This "compression ratio control system" can also be called as the "expansion ratio control system".

<Details of Actions>

Next, specific examples of the actions of the control device 2 according to the present embodiment shown in FIG. 1 will be described with using flowcharts. It should be noted that in FIG. 3 and following figures showing the flowcharts, Step is abbreviated as "S".

<First Specific Example>

Figure 3:
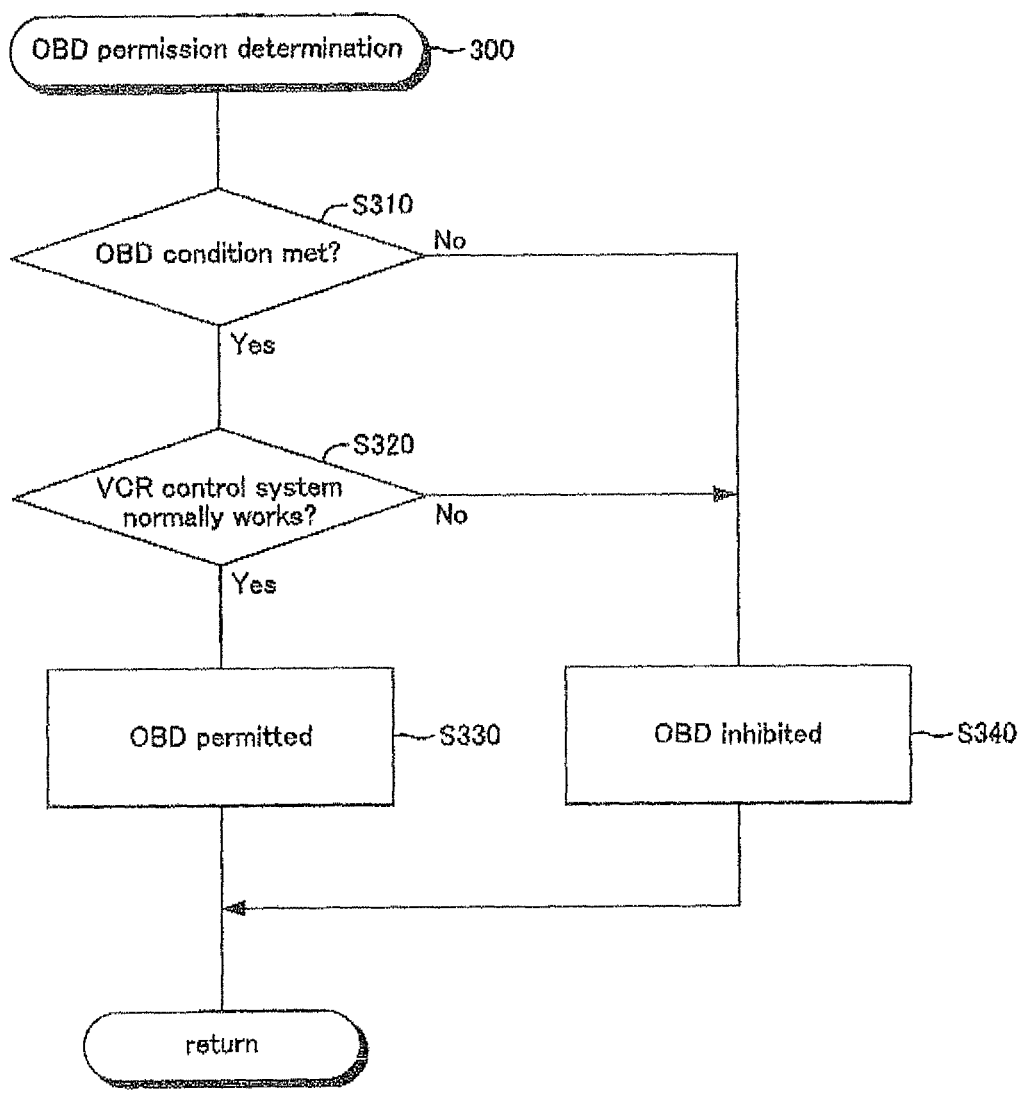
FIG. 3 is a flowchart showing a first specific example of a determination routine for determining whether or not one OBD is permitted.

In a first specific example described below, in the case where the failure is generated in the compression ratio control system, the execution of all the specific OBOs is inhibited. FIG. 3 is a flowchart showing the first specific example of a determination routine for determining whether or not one OBD is permitted. The CPU 201 executes an OBD condition determination routine 300 shown in FIG. 3 at each predetermined timing.

Firstly, in Step 310, it is determined whether or not an execution condition of one specific OBD (such as a catalyst OBD condition) is met. For example, the catalyst OBD condition is that after warming up the engine 1 (cooling water temperature Tw≥Tw0), a change amount of the throttle valve aperture TA per unit time is not more than a predetermined amount, vehicle speed is not less than predetermined speed, and the intake air flow rate is not more than a predetermined rate (intake air flow rate to the extent that so-called "blow-by" is not generated in the upstream catalyst converter 161).

In the case where the OBD condition is met (Yes in Step 310), the processing advances to Step 320, and it is determined whether or not the compression ratio control system normally works. Normality determination of this compression ratio control system is performed as follows.

(1) In the case where a difference $\Delta\epsilon m$ between a target mechanical compression ratio $\epsilon m\_t$ determined by executing a mechanical compression ratio control routine based on the operation state and a mechanical compression ratio acquired value $\epsilon m\_g$ acquired based on an output of the stroke sensor 218 exceeds a predetermined time $\Delta\epsilon m\_err$, the failure is generated in the compression ratio control system.

(2) In a case of the above (1), when a period in which a drive current of the motor in the drive mechanism 142 (this may be acquired by the CPU 201) becomes a maximum value exceeds a predetermine time t err, it is estimated that mechanical trouble is generated in the variable compression ratio mechanism 14.

(3) In a case of the above (1), when the mechanical compression ratio acquired value $\epsilon m\_g$ is fixed even with a change in the target mechanical compression ratio $\epsilon m\_t$, and a period in which the drive current of the motor in the drive mechanism 142 (this may be acquired by the CPU 201) becomes the maximum value does not exceed the predetermine time t err, it is estimated that the failure (such as breaking of wires and troubles) is generated in the stroke sensor 218.

(4) In the case where a mismatch exceeding a predetermined range is generated between a determined value of the opening and closing timing of the intake valve 123 and the exhaust valve 124 by executing an actual compression ratio control routine and an expansion ratio control routine based on the operation state, and an acquired value of the opening and closing timing of the intake valve 123 and the exhaust valve 124 based on outputs of the intake cam position sensor 213a and the exhaust cam position sensor 213b, it is estimated that the failure is generated in the variable intake valve timing device 125 and the variable exhaust valve timing device 126.

A catalyst temperature does not quickly follow changes in the actual compression ratio and the expansion ratio. Because of this, merely poor responsiveness of the variable compression ratio mechanism 14 and the stroke sensor 218 does not cause degradation in precision of the catalyst OBD. Therefore, in the case where execution of the OBD condition determination routine 300 of this time relates to condition determination of the catalyst OBD, even when the above (1) is met but (2) and (3) are not met, it is not determined that the failure is generated in the compression ratio control system (Yes in Step 320).

Meanwhile, the state (such as the composition) of the exhaust gas itself quickly follows the changes in the actual compression ratio and the expansion ratio. Therefore, the execution of the OBD condition determination routine 300 of this time relates to the sensor OBD or the canister purge system OBD, when the above (1) or (4) is met, it is determined that the failure is generated in the compression ratio control system (No in Step 320).

In the case where it is determined that the compression ratio control system normally works (Yes in Step 320), the processing advances to Step 330, the OBD is permitted, and the present routine is once finished. On the other hand, in the case where it is determined that the failure is generated in the compression ratio control system (No in Step 320), the processing advances to Step 340, the OBD is inhibited, and present routine is once finished.

<Second Specific Example>

Figure 4:
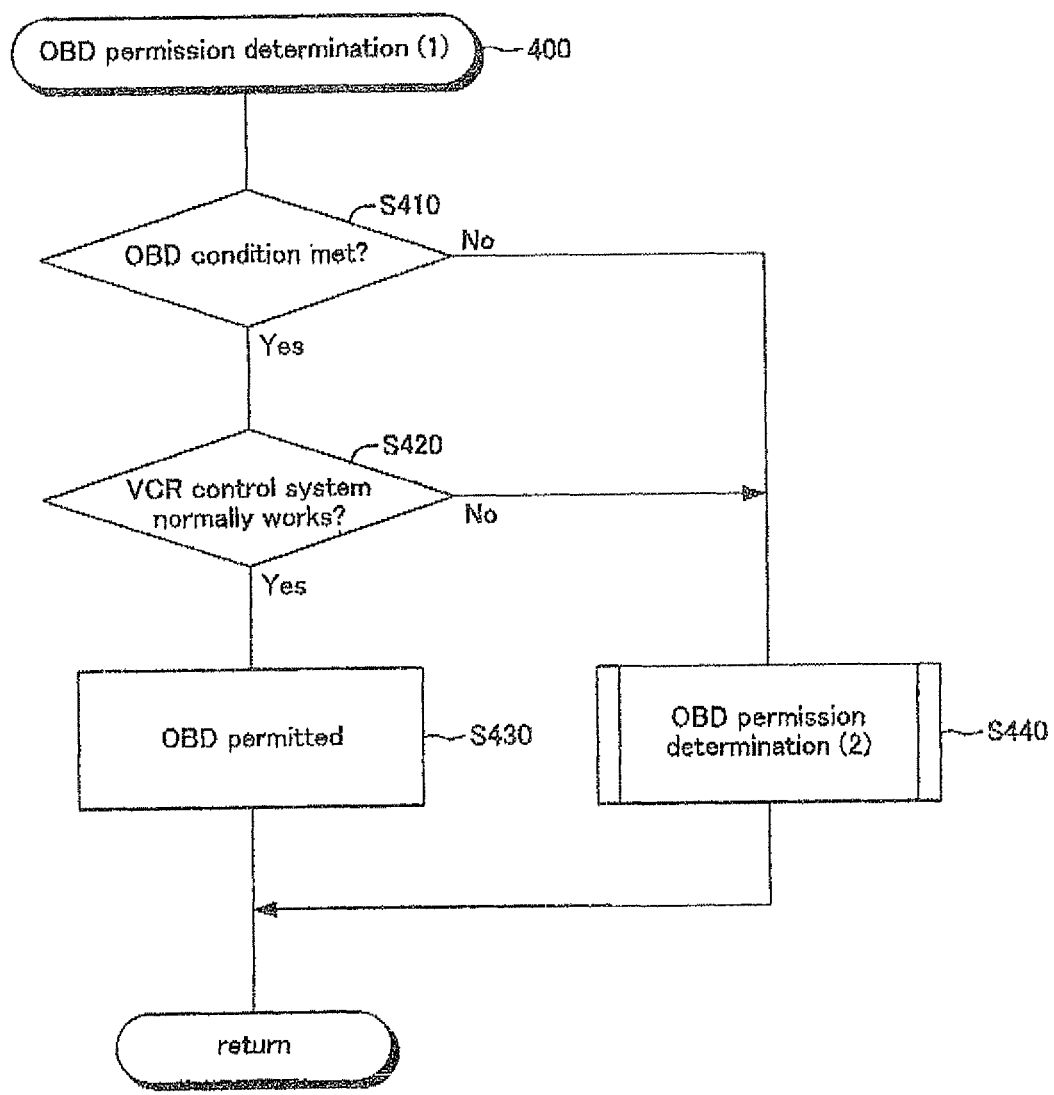
FIG. 4 is a flowchart showing a second specific example of the determination routine for determining whether or not one OBD is permitted.

In a second specific example described below, even in the case where the failure is generated in the compression ratio control system but the setting state of the compression ratio or the expansion ratio is acquirable or the required parameters (such as the temperature of the exhaust gas) are acquirable, execution of executable specific OBD is permitted. FIG. 4 is a flowchart showing the second specific example of the determination routine for determining whether or not one OBD is permitted. The CPU 201 executes an OBD condition determination routine 400 shown in FIG. 4 at each predetermined timing.

Firstly, in Step 410, it is determined whether or not an execution condition of one specific OBD is met as well as the above Step 310. In the case where an OBD condition is met (Yet in Step 410), the processing advances to Step 420, and it is determined whether or not the compression ratio control system normally works.

Figure 5:
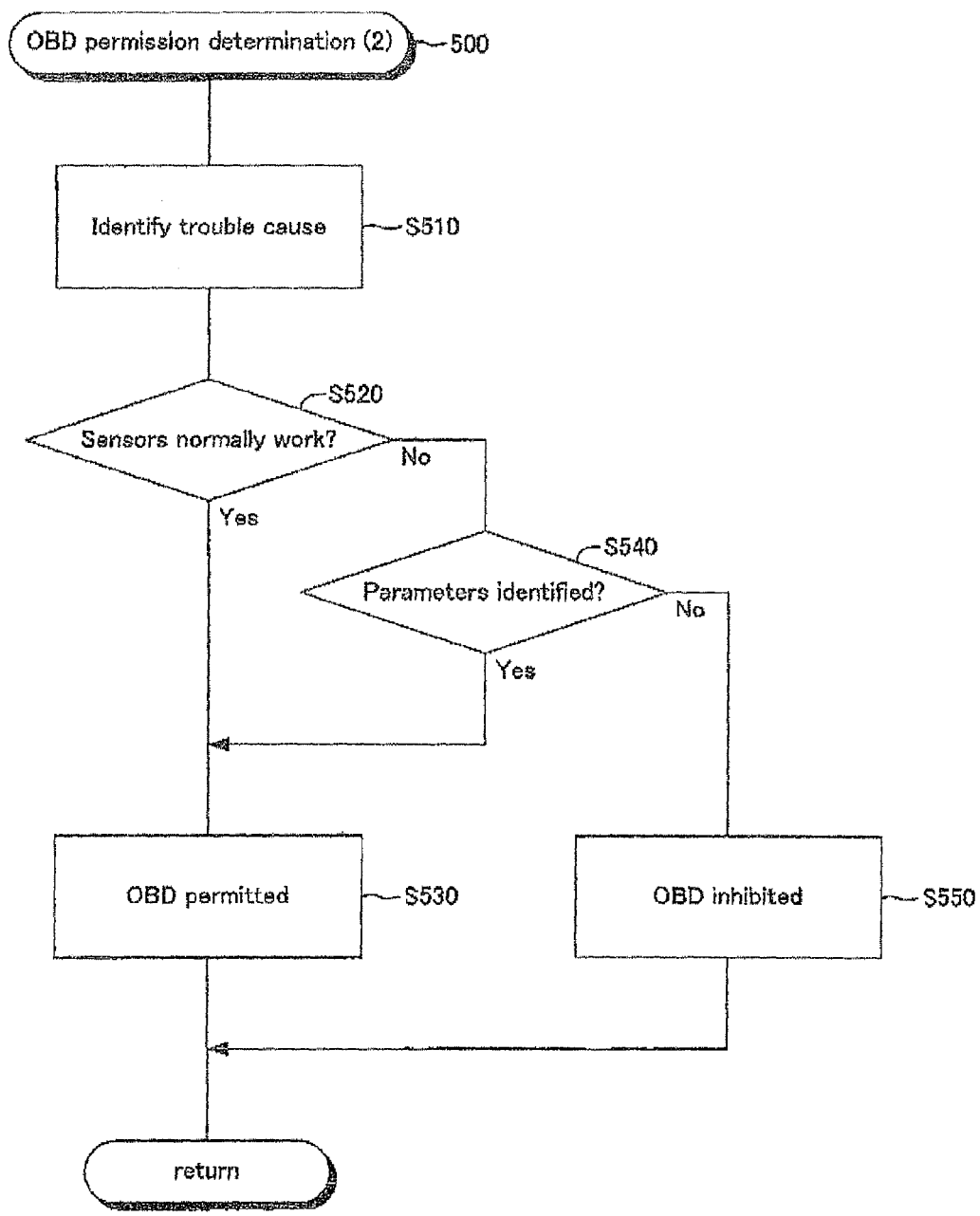
FIG. 5 is a flowchart showing the second specific example of the determination routine for determining whether or not one OBD is permitted.

In the case where it is determined that the compression ratio control system normally works (Yes in Step 420), the processing advances to Step 430, the OBD is permitted, and the present routine is once finished. On the other hand, in the case where it is determined that the failure is generated in the compression ratio control system (No in Step 420), the processing advances to Step 440. In this Step 440, an OBD condition determination sub-routine 500 shown in FIG. 5 is executed.

Firstly, in Step 510, a trouble (failure) cause of the compression ratio control system is identified. This cause identification is performed as (1) to (4) in the above first specific example. Next, the processing advances to Step 520, and it is determined whether or not the sensors such as the compression ratio control system sensors (such as the stroke sensor 218) and the exhaust temperature sensor 217 normally work.

In the case where the sensors normal work (Yes in Step 520), the actual compression ratio or the expansion ratio can be identified, and the actual compression ratio or the expansion ratio comply with the OBD condition (Yes In Step 410). Thus, there is no problem in executing the OBD. For example, in the OBD using an estimated temperature of the catalyst (such as the catalyst OBD and the sensor OBD), when the expansion ratio is identified, the estimated temperature of the catalyst can be precisely acquired. Thus, in the case where the sensors normally work (Yes in Step 520), the processing advances to Step 530, the OBD is permitted, and the routines 500 and 400 are once finished.

Even in the case where some failure is found in the sensors (No in Step 620) but the parameters (such as the temperature of the exhaust gas) required for the OBD can be identified (acquired), there is no problem in executing the ODB. Thus, in the case where determination in Step 520 is "No", the processing advances to Step 540, and it is determined whether or not such parameters can be identified (acquired). For example, in the OBD using the temperature of the exhaust gas or the estimated temperature of the catalyst, in the case where at least The exhaust temperature sensor 217 normally works, it is determined that the parameters can be identified (Yes in Step 540). It should be noted that normality determination of this exhaust temperature sensor 217 can be performed based on history or the like of the sensor outputs from the start of the engine 1, for example.

In the case where it is determined that the parameters can be identified (Yes in Step 540), the processing advances to Step 530, the OBD is permitted, and the routines 500 and 400 are once finished. On the other hand, in the case where it is determined that the parameters cannot be identified (No in Step 540), the processing advances to Step 550, the OBD is inhibited, and the routines 500 and 400 are once finished.

It should be noted that in the present embodiment, a compression ratio acquiring unit (expansion ratio acquiring unit) of the present invention is realized by the ECU 200 (CPU 201) and the stroke sensor 218. Also, a compression ratio control system failure detecting unit of the present invention is realized by the ECU 200 (CPU 201), the stroke sensor 218, and other sensors. Also, a temperature acquiring unit of the present invention is realized by the ECU 200 (CPU 201), the exhaust temperature sensor 217, and other sensors. Also, an intake and exhaust system determining unit and an intake and exhaust system determination permitting unit of the present invention are realized by the ECU 200 (CPU 201).

<Illustration of Modifications>

It should be noted that as described above, the above embodiment is to only illustrate specific configuration examples of the present invention that the applicant thinks the best at the time of filing the present application. From the beginning, the present invention is not limited to the above embodiment at all. Therefore, the specific configurations shown in the above embodiment can be variously modified within a range not changing essential parts of the present invention, as a matter of course.

Hereinafter, some modifications will be illustrated. in the following description of the modifications, constituent elements having the same configurations and functions as the constituent elements in the above embodiment will be given the same names and the same reference numerals in the modifications. In description of the constituent elements, the description in the above embodiment can be approximately cited within a range not causing contradiction.

However, the modifications are not limited to the following modifications needless to say. Limited interpretation of the present invention based on the description of the above embodiment and the following modifications unjustly harms an advantage of the applicant (in particular, who needs for haste in applying under the firs-to-file rule), unjustly benefits an imitator, and hence is not permitted.

The configurations of the above embodiment, and configurations described in the following modifications can be appropriately combined and applied within a range of not causing technical contradiction, needless to say.

(1) The present invention is not limited to the specific device configurations shown in the above embodiment. For example, changes described in detail below can be made.

The present invention can be applied to a gasoline engine, a diesel engine, a methanol engine, a bio-ethanol engine, and other arbitrary internal combustion engines. The number of cylinders (one or more), a manner of arranging cylinders in a case of plural cylinders (in-line type, V type, horizontally opposed type), and a manner of jetting the fuel (port-injection type, in-cylinder direct injection type, combined use of both the types) are not particularly limited.

Figure 6:
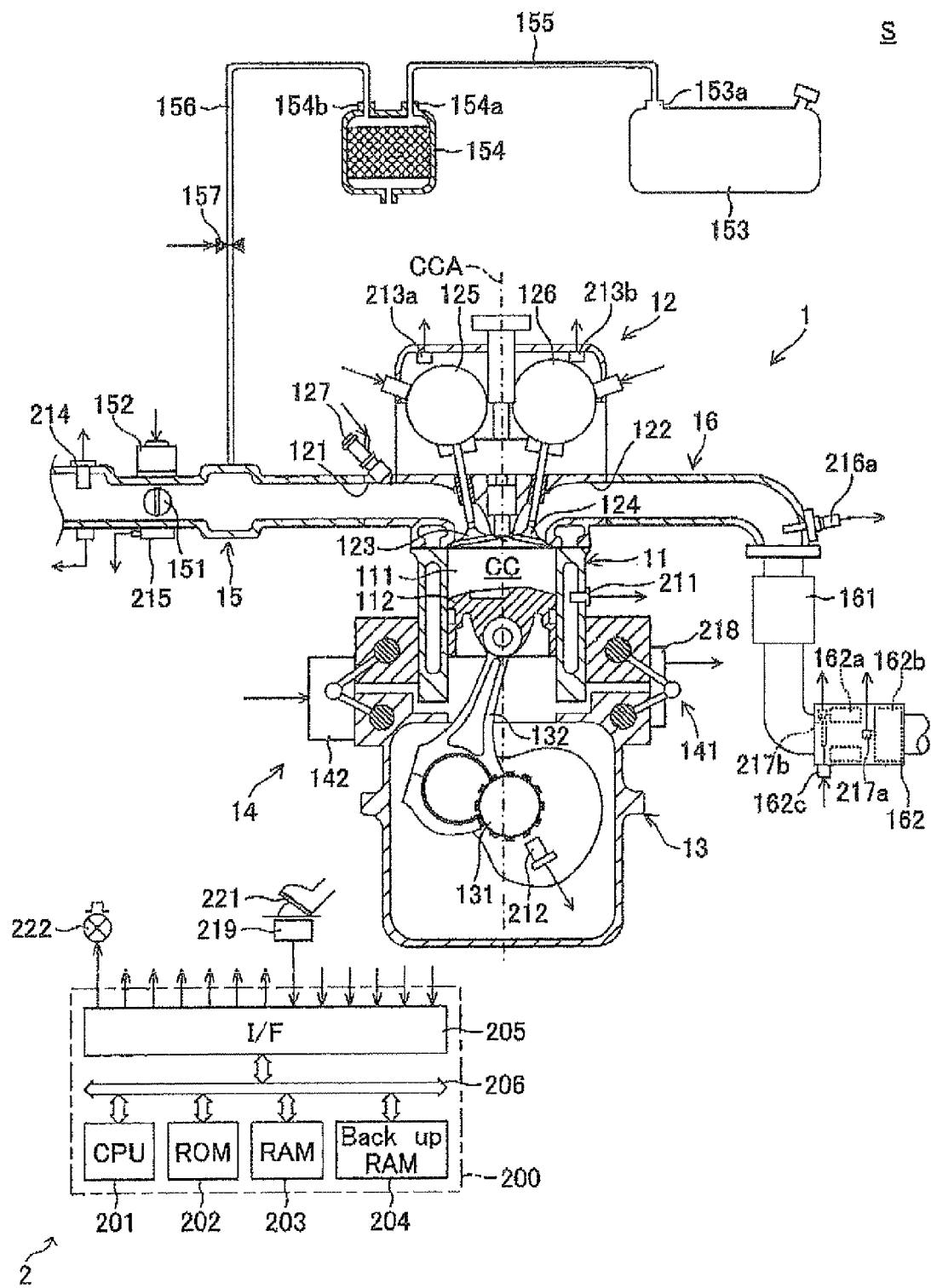
FIG. 6 is a schematic configuration diagram of major parts in one modification of the engine system shown in FIG. 1.

(1-1) FIG. 6 is a schematic configuration diagram of major parts in one modification of the engine system S shown in FIG. 1. As shown in FIG. 6, the downstream catalyst converter 162 may be provided with a HC absorption material 162a inside.

The HC absorption material 162a is a mesh-type filter made of zeolite or the like, and is formed so as to absorb HC molecules. This HC absorption material 162a is formed in an annular or tubular shape.

On the downstream side in the flowing direction of the exhaust gas relative to the HC absorption material 162a, a main catalyst 162b serving as a ternary catalyst is provided. The exhaust gas flowing toward the main catalyst 162b can pass through an inside space in the annular or tubular HC absorption material 162a.

On the side of an inlet of the exhaust gas in the above inside space of the HG absorption material 182a, a switching valve 162c is provided. This switching valve 162c is formed and arranged so that by closing the inlet, almost the entire amount of the exhaust gas flowing into the downstream catalyst converter 162 can be introduced to the HC absorption material 162a. This switching valve 162c is formed and arranged so that by opening the inlet, most part of the exhaust gas flowing into the downstream catalyst converter 162 is introduced to the inside space of the HC absorption material 162a.

Exhaust temperature sensors 217a and 217b are provided in the downstream catalyst converter 182. The exhaust temperature sensor 217a is formed and arranged so as to generate en output corresponding to a temperature of the exhaust as on the downstream side in the flowing direction of the exhaust gas relative to the HO absorption material 162a. The exhaust temperature sensor 217b is formed and arranged so as to generate an output corresponding to a temperature of the exhaust gas on the in-flow side of the exhaust gas relative to the HC absorption material 162a.

The OBD of the downstream catalyst converter 162 (HC absorption system OBD such as trouble diagnosis of the switching valve 162c) with such a configuration is performed based on the outputs or the like of the exhaust temperature sensors 217a and 217b (refer to Japanese Patent Application Publication No. 2008-133802). The present invention can be also preferably applied to such OBD.

Figure 7:
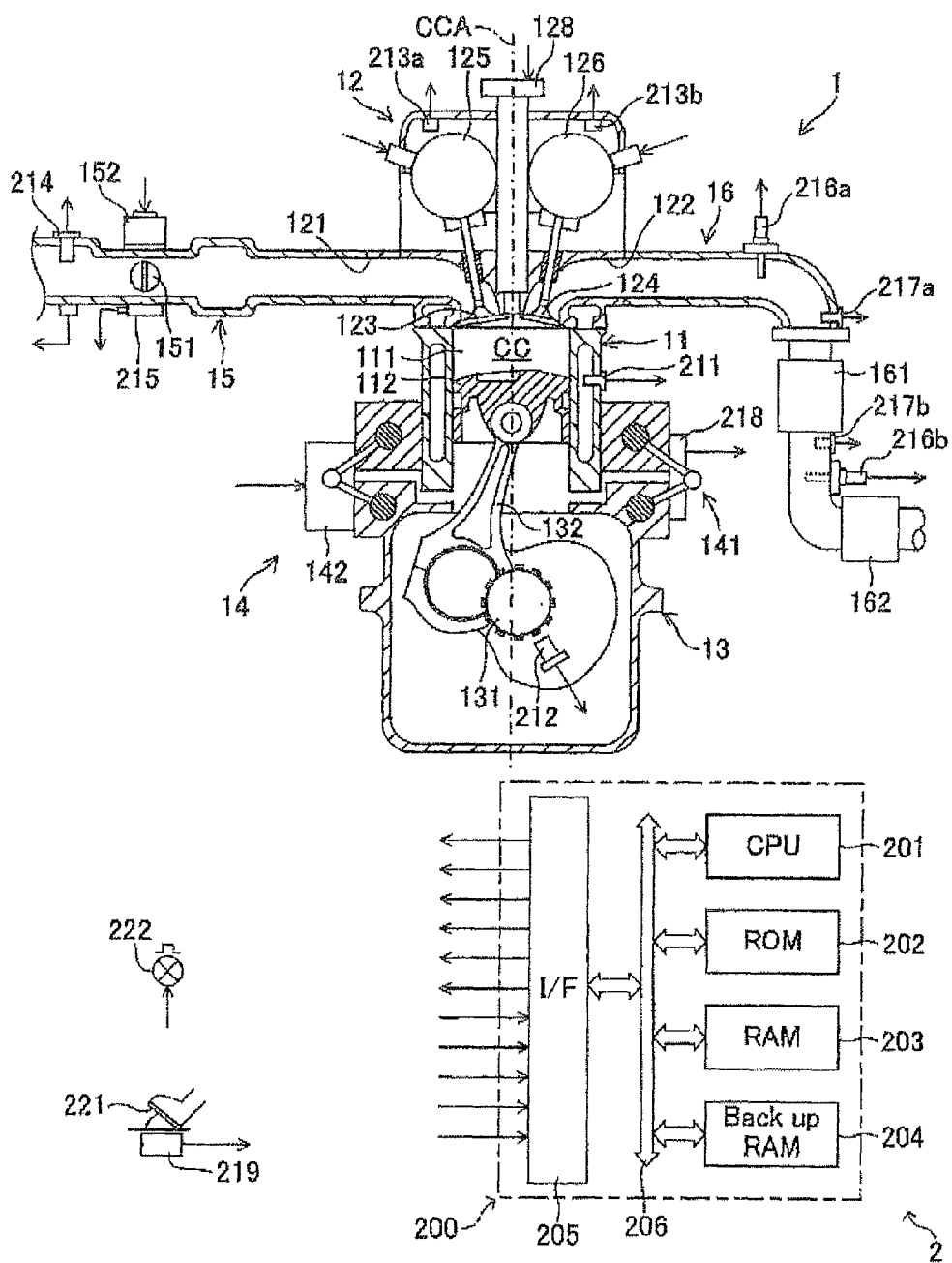
FIG. 7 is a schematic configuration diagram of major parts In one of other modifications of the engine system shown in FIG. 1.

(1-2) FIG. 7 is a schematic configuration diagram of major parts in one of other modifications of the engine system S shown in FIG. 1. As shown in FIG. 7, the engine 1 in the present modification is a diesel engine, and an in-cylinder injector 128 connected to a common rail (not shown) is installed to the cylinder head 12.

In this case, the upstream catalyst converter 181 may be provided with a NSR catalyst (NOx storage reduction catalyst NSR is an abbreviation of NOx Storage Reduction), and the downstream catalyst converter 162 may be provided with a DPF (diesel particulate filter).

It should be noted that the upstream catalyst converter 181 may be provided with a DPNR catalyst (DPNR is an abbreviation of Diesel Particulate-NOx Reduction) in place of the NSR catalyst. In this case, the downstream catalyst converter 162 can be omitted.

In the case where the upstream catalyst converter 161 is the NSR catalyst or the DPNR catalyst, as shown in FIG. 7, the exhaust temperature sensor 217a can be provided on the upstream side in the flowing direction of the exhaust gas relative to the upstream catalyst converter 161, and the exhaust temperature sensor 217b can be provided on the downstream side in the flowing direction of the exhaust gas relative to the upstream catalyst converter 161.

The present invention can be preferably applied to OBD of the NSR catalyst or the DPNR catalyst in such an engine system S.

Figure 8:
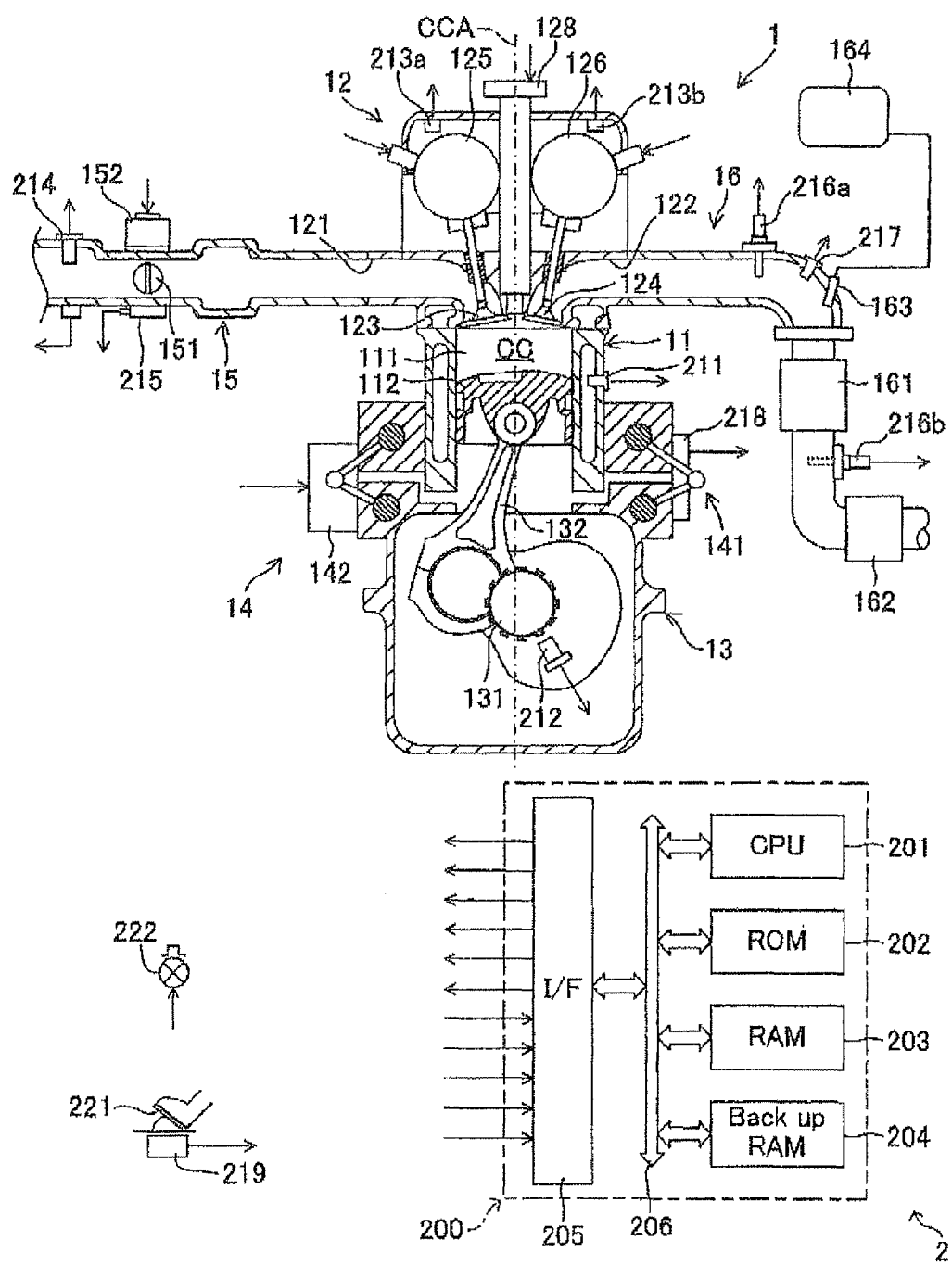
FIG. 8 is a schematic configuration diagram of major parts in further one of other modifications of the engine system shown in FIG. 1.

(1-3) FIG. 8 is a schematic configuration diagram of major parts in further one of other modifications of the engine system S shown in FIG. 1. As shown in FIG. 8, the upstream catalyst converter 161 may be provided with a SCR catalyst (selective catalytic reduction catalyst: SCR is an abbreviation of Selective Catalytic Reduction), and an urea solution injector 163 may be provided on the upstream side in the flowing direction of the exhaust gas relative to this upstream catalyst converter 161. The urea solution injector 163 is formed and arranged so as to jet an urea solution stored in an urea solution tank 164 in the exhaust passage 16.

In this case, the upstream air-fuel ratio sensor 216a and the downstream air-fuel ratio sensor 216b are NOx sensors, and the downstream catalyst converter 162 can be provided with an oxygen catalyst.

The present invention can be preferably applied to OBD of the upstream catalyst converter 161, the urea injector 163, and the like in such an engine system S.

(1-4) The configuration of the engine 1 including the variable compression ratio mechanism 14 is not limited to the above embodiment. For example, even in the case where the engine 1 is formed so that the connecting rod 132 has a multi-link structure, and by changing a bent state of this connecting rod 132, the mechanical compression ratio is changed (refer to Japanese Patent Application Publication No. 2004-156541 and the like), the present invention is favorably applied.

(2) The present invention is not limited to the specific processing contents described in the above specific examples. For example, a change described in detail below can be made.

The compression ratio acquiring unit and the expansion ratio acquiring unit of the present invention are not limited to means as disclosed in the above embodiment. For example, by using a pressure sensor (cylinder inner pressure sensor) provided in the cylinder head 12 in place of the stroke sensor 218, the compression ratio and the expansion ratio can be acquired.

(3) Other modifications which are not particularly mentioned are also included in a technical scope of the present invention within a range not changing the essential parts of the present invention, as a matter of course.

Further, elements whose operations and functions are expressed among the elements forming the means for solving the problem of the present invention include any structures capable of realizing the operations and the functions in addition to the specific structures disclosed in the above embodiment and the modifications.

It should be noted that contents of the patent documents referred in the present specification (including specifications and drawings thereof) can be cited as forming part of the present specification.

The invention claimed is:

1. An engine system control device to be applied to an engine system provided with an engine having a variable compression ratio mechanism capable of changing a compression ratio, comprising:
   a compression ratio acquiring unit configured to acquire a setting state of the compression ratio by the variable compression ratio mechanism;
   a compression ratio control system failure detecting unit configured to detect generation of failure in a compression ratio control system including the variable compression ratio mechanism and the compression ratio acquiring unit;
   an intake and exhaust system determining unit configured to determine a state of a member placed in an intake and exhaust system of the engine; and
   an intake and exhaust system determination permitting unit configured to permit determination by the intake and exhaust system determining unit, wherein
   the intake and exhaust system determination permitting unit is configured to inhibit the determination by the intake and exhaust system determining unit, in the case where the compression ratio control system failure detecting unit detects the generation of the failure.

2. The engine system control device according to claim 1, wherein
   the intake and exhaust system determining unit is configured to determine the state of the member placed in a passage of an exhaust gas discharged from the engine.

3. The engine system control device according to claim 2, wherein
   the intake and exhaust system determination permitting unit is configured to permit the determination by the intake and exhaust system determining unit, in the case where the compression ratio control system failure detecting unit detects the generation of the failure but the setting state of the compression ratio is acquirable.

4. The engine system control device according to claim 3, further comprising:
   a temperature acquiring unit configured to acquire a temperature of the exhaust gas discharged from the engine or the member placed in the passage of the exhaust gas, wherein
   the intake and exhaust system determination permitting unit is configured to permit the determination by the intake and exhaust system determining unit, in the case where the compression ratio control system failure detecting unit detects the generation of the failure but the temperature is acquirable by the temperature acquiring unit.

5. The engine system control device according to claim 2, further comprising:
   a temperature acquiring unit configured to acquire a temperature of the exhaust gas discharged from the engine or the member placed in the passage of the exhaust gas, wherein
   the intake and exhaust system determination permitting unit is configured to permit the determination by the intake and exhaust system determining unit, in the case where the compression ratio control system failure detecting unit detects the generation of the failure but the temperature is acquirable by the temperature acquiring unit.

6. The engine system control device according to claim 1, wherein
   the intake and exhaust system determination permitting unit is configured to permit the determination by the intake and exhaust system determining unit, in the case where the compression ratio control system failure detecting unit detects the generation of the failure but the setting state of the compression ratio is acquirable.

7. The engine system control device according to claim 6, further comprising:
   a temperature acquiring unit configured to acquire a temperature of the exhaust gas discharged from the engine or the member placed in the passage of the exhaust gas, wherein
   the intake and exhaust system determination permitting unit is configured to permit the determination by the intake and exhaust system determining unit, in the case where the compression ratio control system failure detecting unit detects the generation of the failure but the temperature is acquirable by the temperature acquiring unit.

8. The engine system control device according to claim 1, further comprising:
   a temperature acquiring unit configured to acquire a temperature of the exhaust gas discharged from the engine or the member placed in the passage of the exhaust gas, wherein
   the intake and exhaust system determination permitting unit is configured to permit the determination by the intake and exhaust system determining unit, in the case where the compression ratio control system failure detecting unit detects the generation of the failure but the temperature is acquirable by the temperature acquiring unit.

* * * * *